United States Patent [19]

Geiser et al.

[11] Patent Number: 4,624,612

[45] Date of Patent: Nov. 25, 1986

[54] GUIDE-BAR DEVICE FOR MULTI-SPINDLE LATHE

[75] Inventors: Markus Geiser, Péry; Claude Vandevoir, La Neuveville, both of Switzerland

[73] Assignee: Sameca, S.A., Lamboing, Switzerland

[21] Appl. No.: 594,286

[22] Filed: Mar. 28, 1984

[30] Foreign Application Priority Data

Apr. 8, 1983 [EP] European Pat. Off. ........ 83810142.6

[51] Int. Cl.[4] .............................................. B65H 7/00
[52] U.S. Cl. ........................................ 414/18; 82/2.5; 82/38 A; 403/300
[58] Field of Search ...................... 414/17, 18; 82/2.5, 82/2.7, 3, 38 A; 403/100, 300; 89/12, 13 R, 33.03, 155, 156, 157

[56] References Cited

U.S. PATENT DOCUMENTS

| 2,327,916 | 8/1948 | Marlotte | 414/17 |
| 2,548,786 | 4/1951 | Harney | 414/17 |
| 3,141,377 | 7/1964 | Butterworth | 89/26 |
| 3,768,362 | 10/1973 | Grimm et al. | 89/26 |
| 3,823,628 | 7/1974 | Fortune | 414/17 X |
| 4,406,190 | 9/1983 | Mason | 82/2.7 X |

FOREIGN PATENT DOCUMENTS 1444849 8/1976 United Kingdom ............... 82/38 A

Primary Examiner—Robert J. Spar
Assistant Examiner—Donald W. Underwood
Attorney, Agent, or Firm—Wender Murase & White

[57] ABSTRACT

The device comprises a barrel which is indexed by a multi-spindle lathe at each machining operation. The barrel comprises guiding tubes for the bars to be machined which are in rotation in a fluid delivered between the guiding tube and the bar by pipes connected by tubular shafts to a fluid distributor having inlets connected to different sources of pressure. The feed of the bar is controlled exclusively by a feeding piston under the action of the pressure of the fluid delivered by extension tubes located at the rear of the guiding tubes and maintained in alignment with the latter by sliding rings which ensure the tightness between the tubes. At the time provisioning of a guiding tube with a new bar, the piston is retracted out of the guiding tube into the corresponding extension tube, the sliding ring is shifted on the extension tube and the latter pivots about the corresponding tubular shaft to open the inlet of the barless guiding tube to permit delivery from the side, of a new bar to be machined opposite this inlet. This arrangement leads to a compact construction and facilitates automatization of bar provisioning.

10 Claims, 9 Drawing Figures

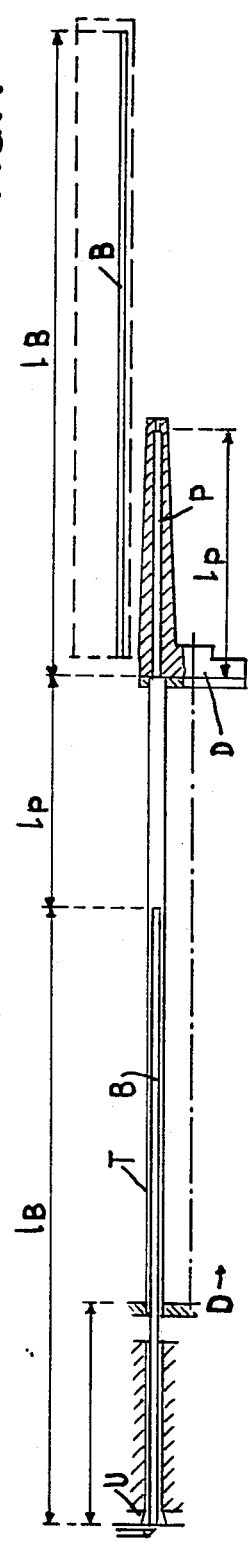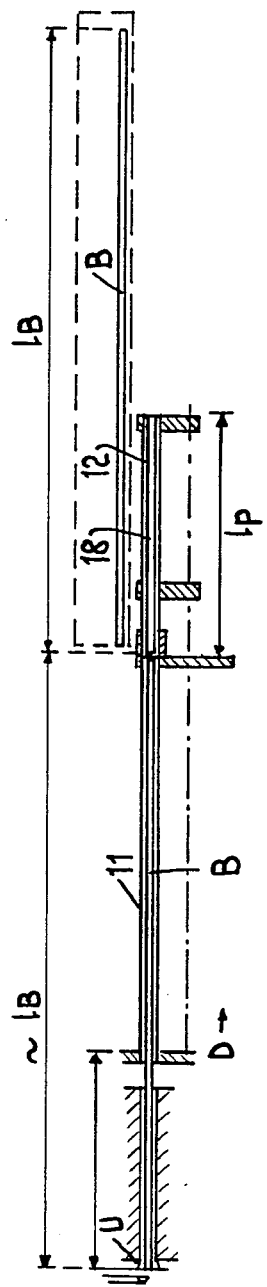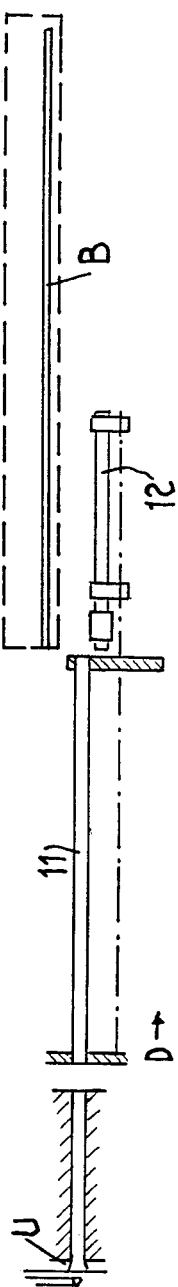

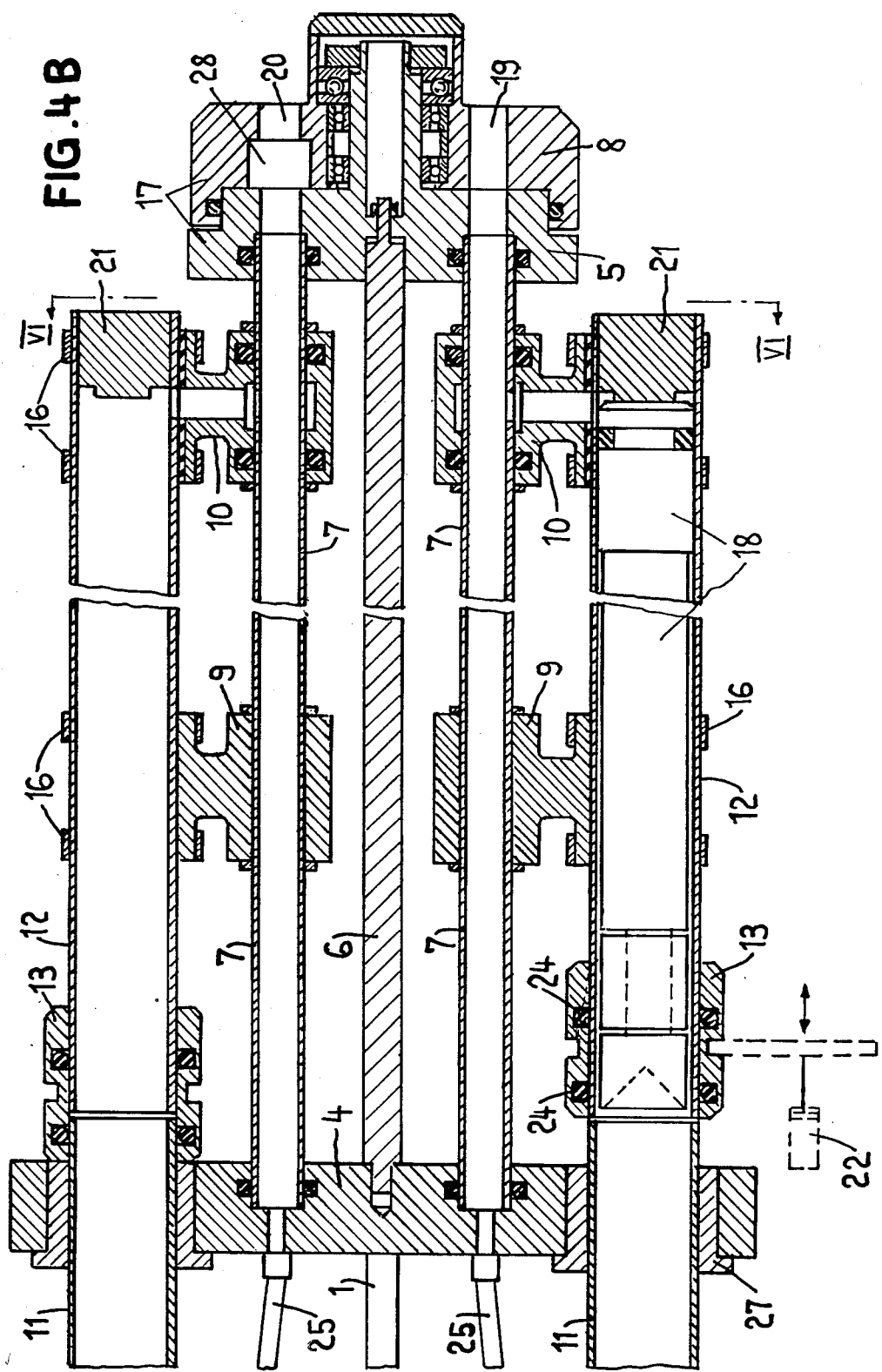

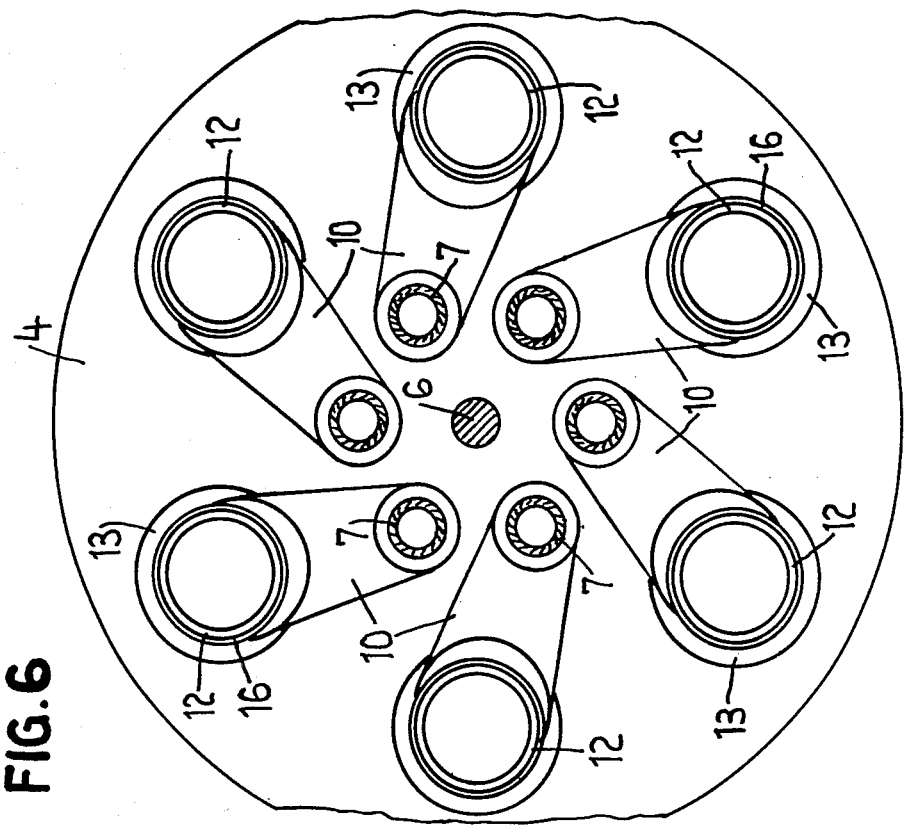
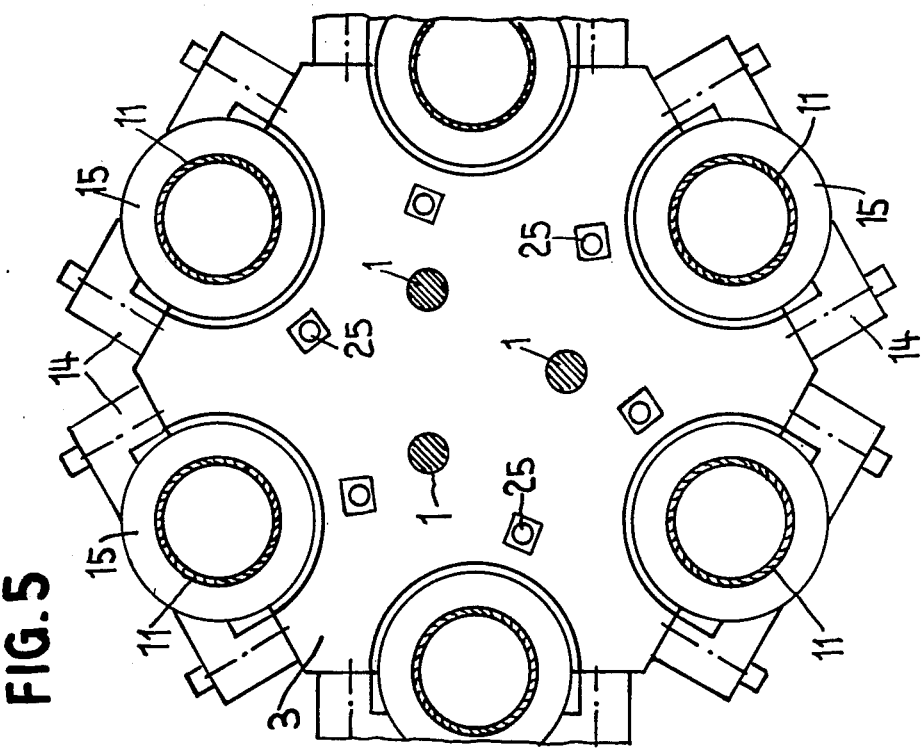
FIG.6
FIG.5

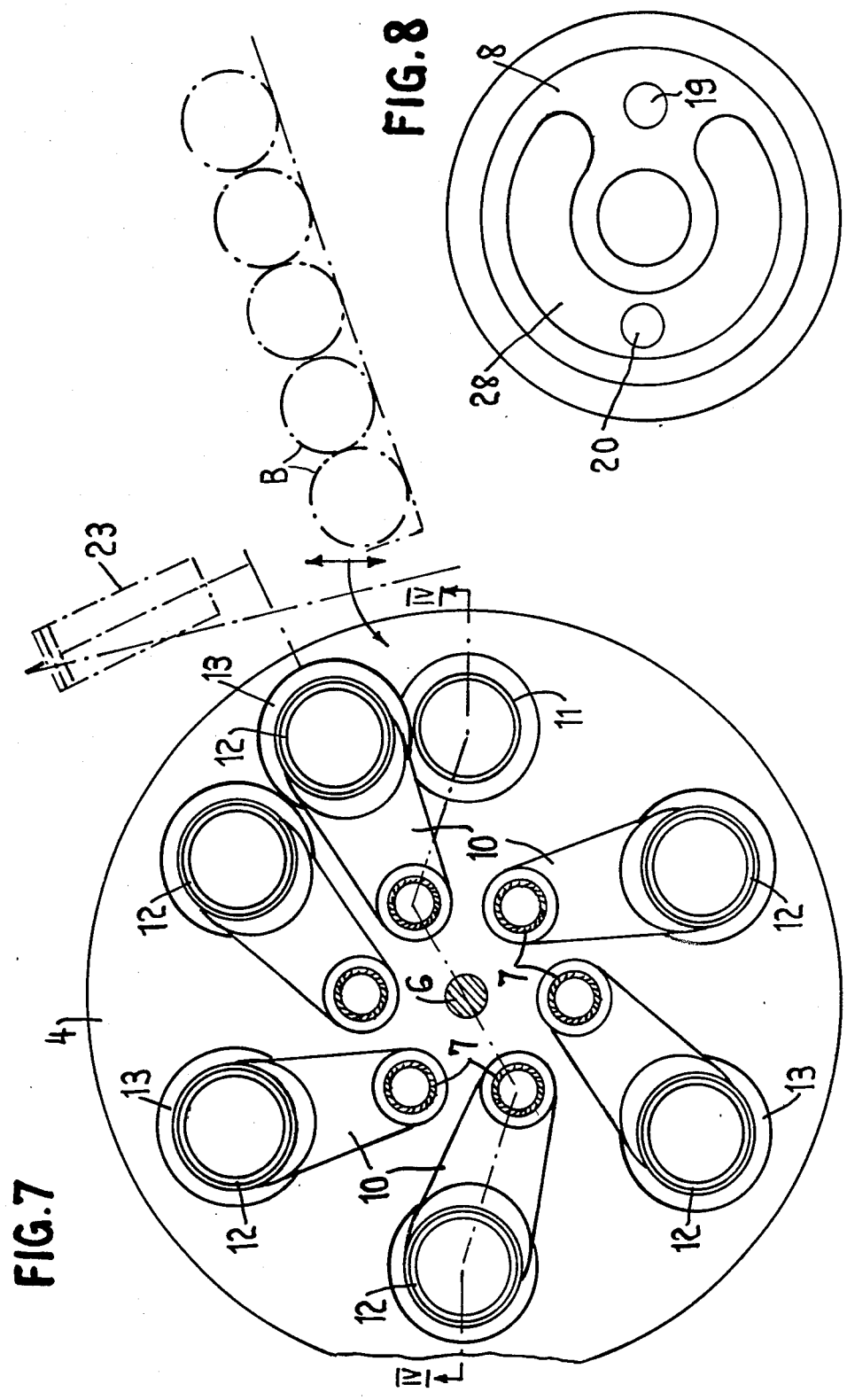

GUIDE-BAR DEVICE FOR MULTI-SPINDLE LATHE

BACKGROUND OF THE INVENTION

The present invention relates to a guide-bar device for a multi-spindle lathe with a barrel comprising a plurality of guiding tubes, each of the guiding tubes supporting a bar to be machined in rotation in a fluid, the rear part of said bar being supported by a piston located in the tube.

Generally speaking and until now it was not possible to achieve, with multi-spindle lathes, speeds of rotation of the spindles as high as the speeds now achieved with the single spindle lathes of equal capacity. However, the technological evolution of the cutting tools and oils on the one hand, and the imperatives of the market on the other hand, give rise to a need to increase the speeds of rotation of the spindles of multi-spindle lathes. This is an evolution similar to the one which has taken place in the last years between the conventional single-spindle lathes with cams and the single spindle lathes with numerical control (CNC). Consequently, the technical evolution of the guide-bar devices for the multi-spindle lathes shall, in the future, play a prominent part due to the fact that the mechanical devices presently in service cannot follow the possible speeds of the spindles of multi-spindle lathes. The production capacity of multi-spindle lathes therefore depends to a large extend on improvements in guide-bar devices. The purpose of the present invention is to provide precisely such an improvement.

Known guide-bar devices comprise a barrel of steel tubes, the feed of the bar being generally provided by a feed collet located in the headstock of the lathe. Due to the low speeds of rotation, it is relatively easy to absorb the noise created by the vibrations of the rotating bars, either by providing insulating materials around the tubes of the barrel or by upholstering the whole aggregate in order to suppress the noise toward the outside. These sound dampening means however are not satisfactory because the noise is the result of vibrations and even if one could provide a perfect acoustic insulation, one would not suppress the vibrations of the bar which are transmitted along the latter in the machining area of the pieces and which cause a deterioration in the finish of the machine surface, make it difficult to machine to prescribed tolerances and accelerate the deterioration of cutting tools.

From the circular of Hermann Förch Ing., 7000 Stuttgart 80 (Vaihingen), Hauptstrasse 103, Germany, a system called PLO is known which consists of modifying existing guide-bar devices to permit the use of the cutting oil or emulsion of the machine, in order to produce a film of oil or emulsion for damping vibrations from the rotating bar. However, such a device is not satisfactory due to the fact that the rear part of the bar is not supported or centered so that the bar is floating, hammering the internal wall of its guiding tube when rotating. This produces noise and the vibrations are transmitted along the bar in the area where the pieces are machined. Further, the operator has no choice regarding the fluid to be used. He is obliged to use the same oil or cooling water in the guiding tubes which is used in the machining area of the bar. The requirements of these two uses are entirely inconsistent. Fluids which are capable of producing a hydrodynamic bearing do not have the same characteristics of viscosity, emulsion and the like as fluids (e.g. soap water) for cooling cutting tools. Moreover, the guiding tubes of the known device(s) are generally of a mechanical welded construction. The internal diameter of the tube of the barrel is selected in terms of the maximum capacity of the lathe. Thus it is not possible to choose the internal diameter according to the requirements. It is also known that for realizing a hydrodynamic support, it is necessary to adapt the internal diameter of the tubes to the diameter and the profiles of the bars to be machined and this in terms of the speeds of rotation that one wishes to achieve. Due to the fact that known devices are intended to be adapted to an already existing construction, it is often difficult or even impossible to recuperate the fluid coming from the front and rear parts of the guiding tube.

Copending U.S. patent application Ser. No. 540,383 by the same applicant describes a guide-bar device for a mutli-spindle lathe (see FIG. 1) with a hydraulic distributor for controlling the feed of a piston supporting the rear part of the bar in its guiding tube. When a new bar is to be supplied the piston is caused to retreat and it is fully received in a housing of the distributor which is then rotated in order to present an opening opposite the empty tube to be provisioned and a new bar is introduced in this tube through this opening. However, due to the fact that the tubes are mounted on a barrel which is indexed at each operation of machining while the distributor is not indexed, it is necessary to ensure that the piston is fully engaged in the guiding tube before allowing any rotating of the barrel. Such a device has the following disadvantages: The space taken up by the device is not a minimum because the piston must be fully engaged in the guiding tube in order to avoid any risk of damaging of the piston when the barrel is indexed. This requires a difficult checking to ensure that the rear part of the bar is engaged in the guiding tube at least a distance equal to the lensth of the piston. Moreover, the guiding tubes must be perfectly aligned with the housing of the piston in the distributor which itself has to be rotatively mounted.

Modern multi-spindle lathes seek to operate at the same speeds of rotation as single spindle latches with numerical control, while suppressing vibrations and noise and improving accuracy. New machines are available in which the spindles may rotate at different rates as a function of the respective cutting tools and the operations to be performed.

The object of the present invention is to realize a guide-bar device for multi-spindle latches which does not suffer from the disadvantages of the known devices, the device taking up a reduced amount of space and being designed to facilitate the automatization of new bar provisioning.

SUMMARY OF THE INVENTION

To achieve these objects, a guide-bar device according to the present invention further comprises extension tubes arranged at the rear end of the guiding tubes, these extension tubes being indexed with the barrel during a normal working cycle of the multi-spindle lathe, serving as a housing for the pistons during provisioning and being individually retractable laterally for permitting a new bar to be machined to be brought from the side opposite the opening of the guiding tube to be provisioned.

The guide-bar device according to the present invention has a further advantage of permitting increased speed of rotation of the spindles and eliminating the need for feed collets on multi-spindle lathe.

Due to the fact that the bars are held and centered at their rear part by a feeding piston and that they are at least in their middle part hydrodynamically supported in their respective tube, vibrations are strongly reduced and the noise produced by the guide-bar device itself is less than that produced by the lathe. This permits use of the device at high speeds on multi-spindle lathes rotating at higher speeds than those previously achieved and an improvement in the accuracy of the pieces being machined. At the time of provisioning, the feed piston of the barless tube is drawn out from the guiding tube and is introduced in the corresponding extension tube which is retracted laterally in order to often the inlet of the guiding tube to permit a new bar to be presented from the side opposite the end of the guiding tube into the guiding tube. This arrangement results in a reduction in the space taken up by the device as compared to prior devices because the length of the device is diminished (see FIG. 1) by a value P at least equal to the length of the feeding piston and also facilitates automatization of the provisioning with bars, the bars being presented laterally as opposed to axially opposite the inlet of the guiding tube to be provisioned. Due to the fact that the feeding piston controls the feed of the bar to be machined in its guiding tube and in the headstock of the lathe, the feed collet of the multi-spindle lathe may be eliminated which eliminates a complicated and costly device.

The invention will be described further by way of example and with reference to the accompanying drawings.

BRIEF DESCRIPTION OF THE DRAWINGS

FIG. 1 is a schematic view showing the space taken up by a known guide-bar device, FIG. 2 is a schematic view showing the space taken up by the guide-bar device according to the invention, FIG. 3 is a schematic view of the device of FIG. 2 with the extension tube retracted laterally, FIG. 4B is a cross-section of the rear part of the device along the line IV—IV of FIG. 7, FIG. 5 is a cross-section of the device along the line V—V of FIG. 4A, FIG. 6 is a cross-section of the device along the line VI—VI of FIG. 4B, FIG. 7 is a cross-section taken along the line VI—VI of FIG. 4B of the device in the position of provisioning, and FIG. 8 is a top view of the fixed part of the distributor.

DESCRIPTION OF THE PREFERRED EMBODIMENT

Figure 4A:
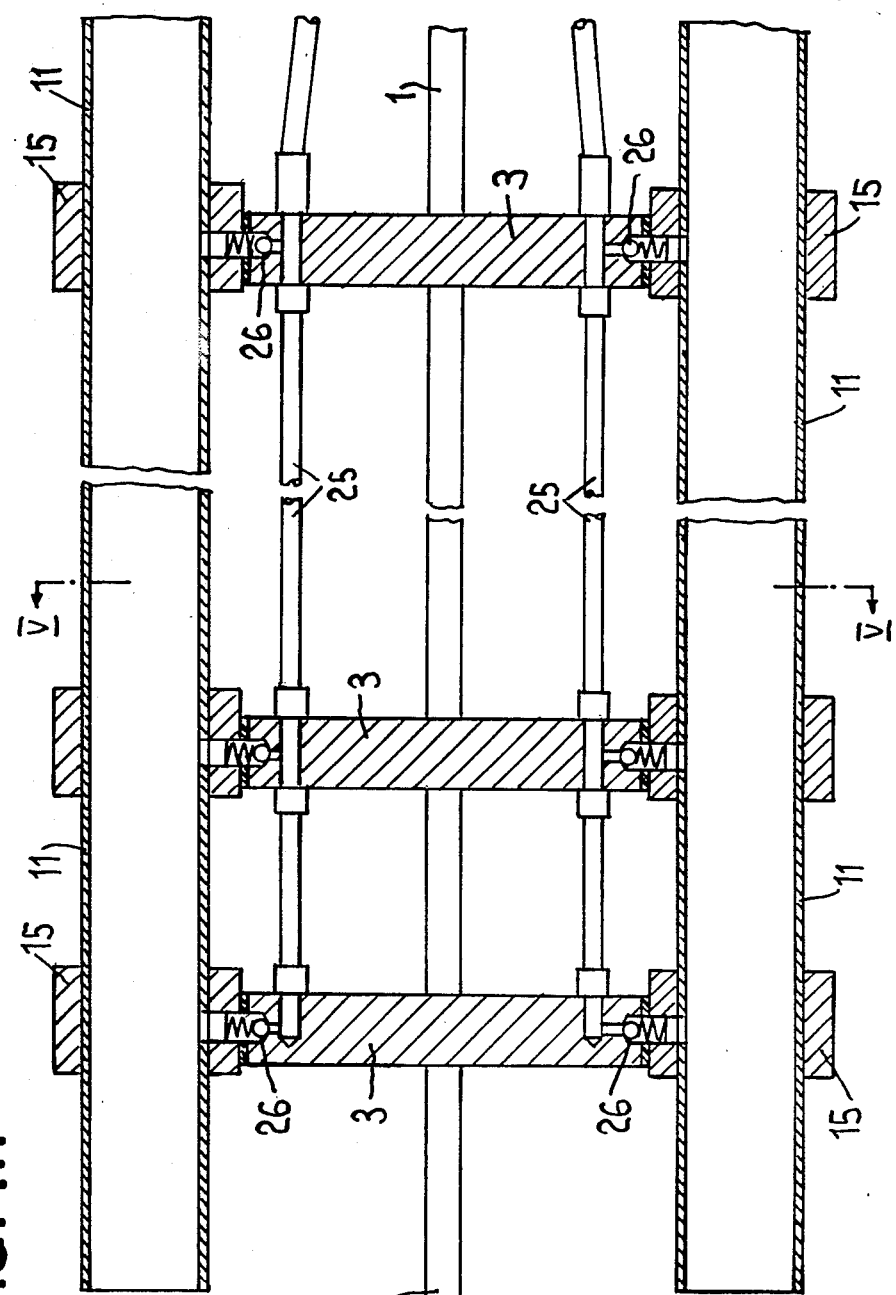
FIG. 4A is a cross-section of the front part of the device along the line IV—IV of FIG. 7.

FIG. 1 shows the space taken up by the device described in copening application Ser. No. 540,383. At the time of provisioning, the feeding piston P having a length $l_p$ and supporting normally the rear part of the bar B in its guiding tube T must be withdrawn from the tube and introduced in a housing of a distributor D which is not indexed with the tubes T of the barrel. A bar b with a length $l_B$ is introduced axially through an opening of the distributor which is located opposite the empty tube to be provisioned. When the end of the right hand side of the bar B is in the guiding tube at a distance $l_P$ from the distributor D, a signal is delivered and the distributor is rotated such that the feeding piston engaged in it is brought opposite the end of the tube which has just been provided with the new bar and the piston is introduced in the tube such that its rear face is well located inside of the tube before any indexing operation of the device is executed. At this time, the left end of the new bar is in the gripping unit of the headstock of the multi-spindle lathe.

FIG. 2 illustrates a device according to the present invention which comprises an extension tube 12 which contains a feeding piston 18 at the point of provisioning. The tube 12 is indexed with the guiding tubes 11 during normal working of the lathe. As shown in FIG. 3, at the time of provisioning, the tube 12 is retracted or tilted laterally with the feeding piston engaged in it to permit the new bar to be presented from the side or laterally opposite the open end of the guiding tube 11 and to be fully introduced in to the tube. At this time, the left end of the bar B, as viewed in FIG. 5, may be in the headstock of the multi-spindle lathe.

Comparing FIGS. 1 and 2, one seeds that the device according to the present invention is shorter than the prior device by an amount equal to the length $l_P$ of the feeding piston. This is due to the fact that the extension tubes 12 are indexed together with the guiding tubes 11 so that after the provisioning operation the extension tube 12 not only be set back in its working position with the feeding piston engaged in it. It is not necessary to introduce the feeding piston 18 into the guiding tube before indexing the device.

According to FIGS. 4A, 4B, 5 and 6, the guide-bar device according to the invention comprises a barrel with three shafts 1 bearing a front disk 2 adapted to be fastened on the rear part of the multi-spindle lathe, intermediate disks 3 and a rear disk 4. The disks 3 and 4 position and hold in place the removable guiding tubes 11 and the removable extension tubes 12 which are located at the rear of the device, as a prolongation of the guiding tubes. The guiding tubes 11 and the extension tubes 12 are normally aligned and tightly bound together by sliding rings 13 bearing tightness joints 24, these sliding rings sitting astride the opposing ends of the tubes 11 and 12. The rear disk 4 lies on a rear support, not illustrated, which maintains the whole device in alignment with the multi-spindle lathe. The disks 3 also serve to distribute oil or hydraulic fluid injected from a distributor 17 through pipes 25 and return or check valves 26 positioned between the internal wall of the guiding tubes 11 and the bar to be machined which rotates in the tube, in order to ensure hydrodynamic support of the bar in the tube.

The guiding tubes 11 are assembled with rings 15 fastened to the disks 3 by flanges 14. The extension tubes 12 are fastened by collars 16 on connecting rods 9 and 10 capable of rotating about tubular shafts 7 mounted by one of their extremities in a rotating part 5 of the distributor 17. The rotating part 5 is set in rotation by the disk 4 via the tubular shafts 7 and a fastening rod 6. The connecting rod 10 has an opening communicating with the shaft 7 for supplying fluid to the rear part of the extension tube 12. The alignment, the drive and the tightness between the guiding tubes 11 and the extension tubes 12 are accomplished by means of the sliding rings 13. Feeding pistons 18, hydraulically controlled by the distributor 17, are inserted in the guiding tubes 11 or in the extension tubes 12. This arrangement facilitates the interchangeability of the guiding tubes 11 and the extension tubes 12. For removing a guiding tube 11, the flanges 14 are loosened and the tube together with the rings 15 and the sleeve 17 are withdrawn in the forward direction of the device. For removing a tube 12, the collars 16 are loosened and the tube is withdrawn. This construction affords a free choice of internal diameter of the tubes 11 and 12 which facilitates the adaptation of the device for any diameter or profile of bars to be machined while assuring formation of a hydrodynamic support of the bar in the tube.

The hydraulic distributor 17 comprises a rotating part 5 connected to the tubular shafts 7 and to the fastening rod 6 and a fixed part 8 connected to an independent hydraulic group, not illustrated, having a plurality of pressure sources. The distributor has the dual function of distributing the fluid delivered to it the guiding tubes 11 by means of the tubular shafts 7, the pipes 25 and the check valves 26, and to the rear of the extension tubes 12, by means of the tubular shafts 7 and the passages in the connecting rods 10, the latter for controlling, by means the feeding pistons 18, the feed of the bars to be machined in the guiding tubes 11 and in the headstock of the multi-spindle lathe. In the described embodiment the supply of fluid is realized by two sources of pressure. The first source supplies the fluid to an aperture 19 which corresponds to the supply of the tube located in the position of provisioning. The second source supplies the fluid to an aperture 20 which, via intermediate circular grooves 28 (FIG. 8), distributes the fluid to all other tubes of the barrel.

The essential elements of the device have been described above. Turning now to the operation of the device, in the case of a normal operating cycle, a bar is engaged in each of the guiding tubes 11 of the barrel, the guiding tubes being held in alignment with the extension tubes 12 by the sliding rings 13 which also provide tightness between them. The supply apertures 19 and 20 of the distributor 17 are both under pressure of the fluid delivered by the hydraulic group. All feeding pistons 18 press against the rear faces of the bars to be machined because of the pressure of the fluid acting on the rear part of the feeding pistons 18. The lathe works in automatic cycle which means that an indexing of the barrel driven by the multi-spindle lathe and a feed of the bar caused by the pushing action of the feeding piston 18 at the time of opening of the gripping unit U of the headstock takes place at each machining operation. The cycle will continue until one of the bars is fully machined. At this time, the lathe stops (there being no further indexing) and a signal is delivered, indicating a lack of material to be machined. It is therefore necessary to introduce a new bar to be machined in the barless guiding tube. To this end, the aperture 19 of the distributor 17 is put under vacuum which causes the withdrawl of the piston 18 out of the barless tube. The other tubes remain under pressure of the fluid supplied to the aperture 20. The feeding piston 18 of the barless tube enters in the corresponding extension tube 12, its rear face acts on a stop 21 and a transducer, not illustrated delivers a signal indicating the position of the feeding piston 18. Upon reception of this signal, the sliding ring 13 is shifted backwards of the tube 12 in order to free the inlet end of the tube 11 which permits the tube 12 to pivot the side around the shaft 7 in the position shown in FIG. 7, together with the sliding ring 13, the connecting rods 9 and 10 connected to the shaft 7 and the feeding piston 18 engaged in the tube 12. The inlet of the guiding tube 11 which is in the position of provisioning then becomes free and a new bar to be machined may be presented from the side in front and opposite this inlet and introduced into the guiding tube 11. The tube 12 is then brought back into alignment with the tube 11 and the tubes 11 and 12 are held together when the sliding ring 13 is shifted forward into its working position astride the opposing ends of the tubes 11 and 12.

The device according to the invention permits automatic for provisioning. To this end (FIGS. 4B and 7), the axial shifting of the sliding ring 13 is caused by a control cylinder 22 in response to the signal delivered when the feeding piston 18 is fully engaged in the extension tube 12, and the rotation of the extension tube around the shaft 7 is caused by a second control cylinder 23. Using a conventional bar feed device, existing it is then easily possible to realize fully automatic provisioning of a multi-spindle lathe.

The device according to the invention has the advantage of making unnecessary the feed collet normally mounted in the headstock of the multi-spindle lathe because the feed of the bar is already controlled by the feeding piston. This is very desirable since the feed collet is a complicated and costly element of the machine. Further, friction in the axial direction of the prestressed feed collet of the bar at each forward movement on the latter produces a marking of the bar and causes wearing of the feed collet which has to be adjusted or replaced. The feed collets are designed for a pre-determined diameter of bar to be machined so that they must be replaced each time the bar diameter is changed, a time consuming operation which leads to considerable tooling costs. Feed collets reduce the maximum capacity of the headstock to 12-16 mm in diameter and, due to the fact that feed collets are prestressed, the introduction of a new bar becomes problematical because a consideration force is required on the rear part of the feed collet to open the latter.

The advantages of the elimination of feed collets in multi-spindle lathes are the following: increase of the maximum practical capacity of the headstock, elimination of a very costly mechanism, reduction of tooling costs, adjusting time and maintenance, and elimination of longitudinal scratching on the bars.

With respect to the device described in above-mentioned U.S. patent application Ser. No. 540,383 the device according to the present invention the following advantages.

In the present device, the bar need only be intrduced into the guiding tube 11 until the rear face of the bar is engaged in the tube while in the device described to U.S. patent application Ser. No. 540,383 the bar must be engaged such that the rear face of it is at a distance from the inlet of the guiding tube, of at least the length of the feeding piston. This requires a difficult checking that the rear part of the feeding piston is fully introduced in the guiding tube. Further, with the present invention, is no risk of damaging of the feeding piston between the guiding tube and the extension tube because the extension tubes are indexed with the barrel and there is no problem with respect to alignment between the guiding tubes and the fixed part of the distributor for the passage of the feeding piston. The fluid distributor of the present invention is smaller and of a more simplified construction since it requires no housing for the feeding piston. Moreover fixed part requires no swivelling.

We claim:

1. A guide bar device for a multi-spindle lathe having a rotatable barrel operable to be indexed by said multi-spindle lathe, said rotatable barrel comprising:
   at least one generally centrally disposed shaft;
   at least one intermediate disk disposed on said shaft;
   a plurality of guiding tubes removably supported by and radially spaced from said shaft by means of said intermediate disk, each of said guiding tubes having an inlet for introducing a bar stock to be machined therein;
   means, associated with each of said guiding tubes, for rotatingly supporting and advancing bar stock in said guiding tubes;
   said guide bar device further comprising:
      a plurality of extension tubes, each positioned opposite the inlet of a respective one of the said guiding tubes for receiving said means for rotatingly supporting and advancing;
      means for removably coupling and aligning said extension tubes with said guiding tubes; and
      means for laterally displacing an extension tube with its associated means for rotatingly supporting and advancing with respect to said respective guiding tube to thereby open the inlet of said respective guiding tube
      whereby bar stock to be machined may be inserted through the open inlet of said guiding tube.

2. The guide bar device according to claim 1, wherein said bar stock rotates within said guiding tube supported by pressurized fluid, and wherein said means for rotatingly supporting and advancing comprises a feeding piston for each of said guiding tubes, said feeding piston being respective to pressurized fluid for advancing said bar stock toward a spindle of said multi-spindle lathe, said guide bar device further comprising:
   a distributor for distributing said pressurized fluid to said guiding tubes to provide hydrodynamic support for said bar stock, and for distributing said pressurized fluid to each of said feeding pistons.

3. The guide bar device according to claim 2, wherein said rotatable barrel further comprises fluid pipes connected between said guiding and extension tubes and said distributor, and wherein said distributor comprises a first, stationary part for receiving pressurized fluid and a second, rotatable part, secured to said rotatable barrel and fluidly connected to said fluid pipes, said second part being rotatingly connected to said first part and having a recess for receiving the pressurized fluid from said first part.

4. The guide bar device according to claim 3, wherein said intermediate disk has fluid passages and said fluid pipes are connected to the fluid passages in said intermediate disk, said fluid passages communicating via check valves with said guiding tubes for delivering said presurized fluid to said guiding tubes.

5. The guide bar device according to claim 3, wherein said extension tubes are pivotally mounted on said fluid pipes by connecting members, said connecting members having lateral passage disposed therein for delivering said pressurized fluid to the extension tubes for controlling the feeding piston therein.

6. The guide bar device according to claim 3, wherein said fluid pipes extend into said second, rotatable part of said distributor for communicating, by means of said recess, with a first and a second inlet of said first, stationary part of said distributor, said first inlet delivering said pressurized fluid to a fluid pipe in a position corresponding to one of said guiding tubes located in a position for provisioning and said second inlet communicating, via a groove, with all other fluid pipes.

7. The guide bar device according to claim 3, wherein said second, rotatable part of said distributor is integral with said rotatable barrel.

8. The guide bar device according to claim 2, wherein each of said guiding tubes is axially aligned with and removably joined to a corresponding one of said extension tubes by means of sliding elements which include tightness joints, each of said sliding elements being coaxially disposed with respect to said guiding tubes and extension tubes and positioned to longitudinally traverse the inlet of one of said guiding tubes at the opposing end of a corresponding extension tube; said sliding elements being operable to be shifted axially onto the extension tube corresponding to said guiding tube in a bar provisioning position for permitting said extension tube and its associated means for rotatingly supporting and advancing to be retracted laterally with respect to said guiding tube in the bar provisioning position to open the inlet of said guiding tube to permit bar stock to be inserted therein.

9. The guide bar device according to claim 8, wherein said distributor further comprises vacuum means for retracting said feeding piston into said extension tube.

10. A guide bar device for a multi-spindle lathe having a rotatable barrel operable to be indexed by the multi-spindle lathe, said rotatable barrel comprising a generally centrally disposed shaft, an intermediate disk disposed on said shaft, and a plurality of guiding tubes removably supported by and radially spaced from said shaft by means of said intermediate disk, each of said guiding tubes enclosing bar stock to be machined, and having an inlet and an associated means for rotatingly supporting and advancing bar stock in said guiding tube, said guide bar deviced further comprising:
   a plurality of extension tubes;
   each of said extension tubes corresponding to and being disposed opposite an inlet of one of said plurality of guiding tubes and having a sufficient axial length to fully receive and enclose said means for supporting and advancing;
   a plurality of sliding elements for axially aligning each of said extension tubes with a corresponding guiding tube, each of said sliding elements being axially positioned to longitudinally traverse the inlet of one of said guiding tubes and the opposing end of a corresponding extension tube to form fluid tight connections between said guiding and extension tubes;
   each of said sliding elements being axially shiftable with respect to its corresponding guiding tube for permitting said corresponding extension tube, together with its associated means for supporting and advancing received therein, to be laterally retracted relative to said corresponding guiding tube for opening the inlet of said corresponding guiding tube when said guiding tube is in a predetermined bar stock provisioning position;
   said guide bar device further comprising a first cylinder means for engaging and controlling the axial shifting of said sliding elements in response to a signal indicating that the means for supporting and advancing received in said extension tube is in a stop position, and a second cylinder means for engaging and controlling the lateral retraction of an extension tube to thereby open the inlet of the guiding tube corresponding to said extension tube.

* * * * *